April 21, 1925.
J. R. GAMMETER
1,534,104
GOLF BALL AND METHOD OF MAKING THE SAME
Filed May 26, 1921
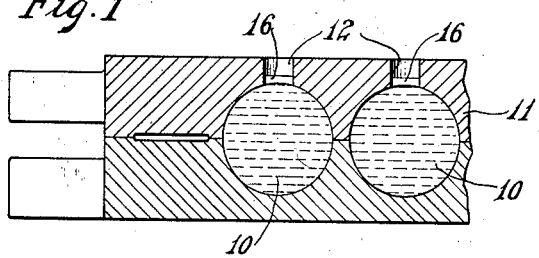
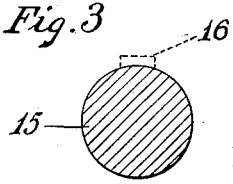
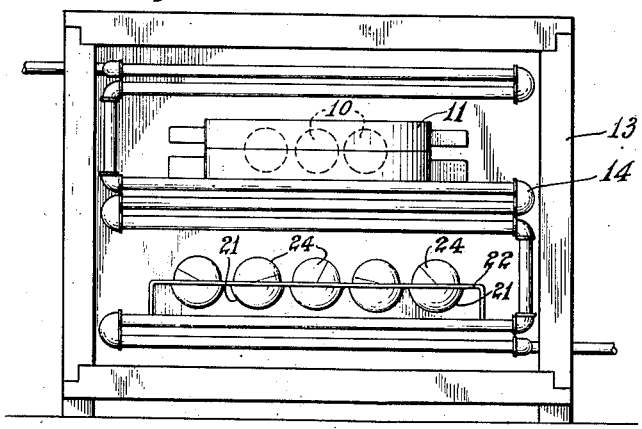
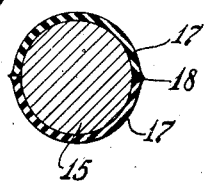
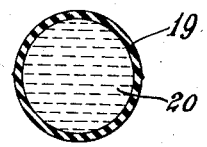
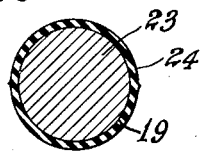
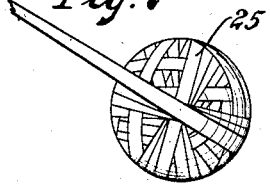
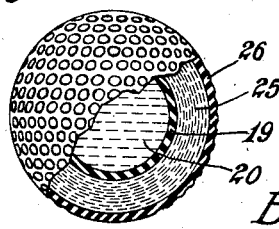
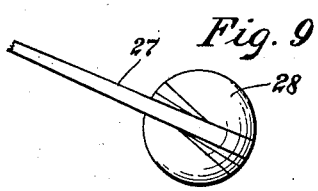
Inventor
John R. Gammeter
By Robert M. Pierson
Atty.

Patented Apr. 21, 1925.

1,534,104

UNITED STATES PATENT OFFICE.

JOHN R. GAMMETER, OF AKRON, OHIO, ASSIGNOR TO THE B. F. GOODRICH COMPANY, OF NEW YORK, N. Y., A CORPORATION OF NEW YORK.

GOLF BALL AND METHOD OF MAKING THE SAME.

Application filed May 26, 1921. Serial No. 472,734.

*To all whom it may concern:*

Be it known that I, JOHN R. GAMMETER, a citizen of the United States, residing at Akron, in the county of Summit and State of Ohio, have invented a certain new and useful Golf Ball and Method of Making the Same, of which the following is a specification.

This invention relates to the art of manufacturing golf-balls containing a mobile core material, and its principal objects are to prevent a deforming of the spherical golf-ball cores or inner core members when placing layers of rubber thereon, and to secure greater uniformity in golf-balls and to increase their flight.

Fig. 1 of the accompanying drawings is a sectional view showing a mold containing core material in spherical cavities in which the material is set.

Fig. 2 is an end view of an open freezing chamber containing the cores.

Fig. 3 is a sectional view of a set core-pellet.

Fig. 4 is a sectional view showing the same covered with an unvulcanized rubber capping stock.

Fig. 5 is a similar view showing a vulcanized rubber envelope containing the core in a fluid state.

Fig. 6 is a sectional view of a frozen core material capped with a vulcanized rubber cover.

Fig. 7 is a side elevation of a partially wound ball.

Fig. 8 is a side elevation, partly in section, showing the complete ball.

Fig. 9 is a side elevation of a partially wound pellet and shows a modified method of applying a rubber envelope to the core material.

My invention comprises a freezing of a spherical pellet of a core material which is composed of a mobile substance such, for example, as the viscous liquids commonly employed, or a gelatinous substance such as a glue-glycerine mix, but the invention is not wholly limited to the use of these materials and may be employed with any core material which is not stiff enough to hold its spherical shape in a ball winding machine or other golf-ball forming apparatus.

In the drawing, in which Figs. 1 to 8 illustrate a preferred method of carrying out my process, 10 is a liquid gelatinizing mixture in spherical cavities in a two part mold 11 in which the mixture may be placed by pouring it through openings 12 in the upper mold member before the liquid has cooled sufficiently to set. The mixture upon cooling, which may be hastened by placing the molds between the platens of a cold platen press or in a freezing chamber 13 provided with cooling pipes 14, sets to a jell having sufficient stiffness to hold its spherical shape under relatively light pressures. If desired the cooling may be continued until the spherical core members are frozen. A set spherical pellet 15 shown in cross section in Fig. 3 is then removed from the mold, the sprue 16 scraped off and the pellet or inner core member covered with a pair of cup-shaped pieces of vulcanizable rubber capping stock 17, 17, whose edges are squeezed together to make a seam 18, as indicated in Fig. 4.

The raw core thus formed is then placed is spherical cavities in a vulcanizing mold and heat is applied to vulcanize the rubber and weld the cups 17, 17 together forming a single rubber envelope 19, the heat also reducing the gelatinous core material to a liquid state as indicated at 20 (Fig. 5), destroying its tendency to set on cooling. This latter feature, however, I do not claim as my invention. When employing a normally-liquid substance for the inner core member the liquid is frozen in the mold 11 to give this member sufficient stiffness to hold its shape during the capping or other covering operations.

The completed cores are then placed in the cup shaped depressions 21 of a tray 22 in the freezing chamber, whose temperature is preferably maintained at about minus 40° F. to freeze the liquid 20 to a solid cake 23 (Fig. 6) which will hold its spherical shape under the pressure of the rolls of a tape winding apparatus. The temperature of the freezing chamber may be varied according to the freezing point of the core material. Where the vulcanized rubber in the envelope is not stiff enough to retain the cores in spherical form during the freezing of the liquid, suitable complete form members may be employed.

A frozen core 24 is then placed in a winding apparatus, tense rubber tape or thread 25 (Figs. 7 and 8) is applied and the wearing cover 26 of gutta-percha or similar material is then shaped about the thread windings in any suitable manner. After the tense windings have been applied the core material gradually thaws and returns to its liquid state.

This process may be modified in various ways as, for example, by winding an unvulcanized rubber tape 27 onto a frozen pellet 28 (Fig. 9) to form a layer of the desired thickness and heating the core to vulcanize the rubber and unite the windings into an impervious envelope, or by covering a frozen spherical core member with an uncured rubber envelope, cold curing the envelope in any suitable manner as by dipping it in sulphur chloride, the inner core member remaining frozen, and winding the stiff core with rubber tape.

The freezing of the pellet or inner spherical core member provides a rigid spherical center which will retain its shape during the building of the ball and makes it possible to employ light rubber stock in the core envelope in place of stiff rubber compositions in which a filler is incorporated to cause the core to hold its shape when being wound, such balls varying in weight with the variations in thickness of the heavy capping stock, and the freezing further makes it possible to provide a ball having high tension windings applied directly to the core giving the ball a longer flight than when a soft core is first wound with low tension windings by hand to give the core the desired stiffness.

By freezing the inner, spherical core member before applying the enclosing member 19 (Fig. 5), or 27 (Fig. 9), thereto, I am enabled to obtain a perfectly symmetrical core having an envelope of substantially uniform thickness throughout, and so to provide a perfectly balanced ball with less difficulty than is experienced when the liquid or soft core material is enclosed in an envelope before being frozen. Facility and economy in manipulation of such material is effected by freezing it before building any part of the ball thereon, and bunching of the covering material, such as occurs in the tying of the mouth of a liquid-enclosing bag, is avoided.

I claim:

The method of making a golf ball which comprises producing a frozen pellet of normally mobile material, thereafter enclosing said material, while frozen, in an imperforate, vulcanizable-rubber envelope, then vulcanizing said envelope, again freezing said material, and, while it is so frozen, applying additional material to said envelope.

In witness whereof I have hereunto set my hand this 20th day of May, 1921.

JOHN R. GAMMETER.